United States Patent
Beaurepaire et al.

(10) Patent No.: US 10,649,537 B2
(45) Date of Patent: May 12, 2020

(54) MAPPING APPLICATION FOR INTUITIVE INTERACTION

(71) Applicant: HERE Global B.V., Eindhoven (NL)

(72) Inventors: Jerome Beaurepaire, Berlin (DE); Sven Krome, Berlin (DE)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 15/979,059

(22) Filed: May 14, 2018

(65) Prior Publication Data
US 2019/0346930 A1    Nov. 14, 2019

(51) Int. Cl.
*G06F 3/01*      (2006.01)
*H04W 4/021*   (2018.01)
*G06F 16/29*    (2019.01)

(52) U.S. Cl.
CPC .............. *G06F 3/017* (2013.01); *G06F 16/29* (2019.01); *H04W 4/021* (2013.01)

(58) Field of Classification Search
CPC ......... G06F 3/017; G06F 16/29; H04W 4/021
See application file for complete search history.

(56) References Cited

U.S. PATENT DOCUMENTS

| | | | |
|---|---|---|---|
| 8,434,029 B2 | 4/2013 | Albright | |
| 2012/0060088 A1* | 3/2012 | Hill | G06F 3/0481 715/702 |
| 2013/0321461 A1 | 12/2013 | Filip | |
| 2014/0089860 A1* | 3/2014 | Hoyer | G06Q 10/0639 715/843 |
| 2014/0310630 A1 | 10/2014 | Asikainene et al. | |
| 2017/0184405 A1* | 6/2017 | Rachuri | G01C 21/32 |
| 2017/0357431 A1* | 12/2017 | Chang | G06F 3/04883 |

OTHER PUBLICATIONS

Indoor positioning is getting easier, and here's how to get started [online]. Retrieved from the Internet: https://360.here.com/indoor-positioning-is-getting-easier-and-heres-how-to-get-started?utm_content=66688956&utm_medium=social&utm_source=twitter (dated Feb. 2, 2018) 4 pages.
HERE Tracking will save the shipping industry millions and find your lost luggage too [online]. Retrieved from the Internet: https://360.here.com/here-tracking-will-save-the-shipping-industry-milions-and-find-your-lost-luggage-too (dated Dec. 19, 2017) 5 pages.
Micello is joining HERE Technologies! [online] Retrieved from the Internet: https://www.micello.com/here-we-come (undated) 2 pages.

* cited by examiner

*Primary Examiner* — Alexander Eisen
*Assistant Examiner* — Kebede T Teshome
(74) *Attorney, Agent, or Firm* — Alston & Bird LLP

(57) ABSTRACT

A method, apparatus, and computer program product are provided for displaying a mapping application user interface. The mapping application user interface may include at least a first display area and a second display area. A method may be provided for displaying the mapping application user interface that includes displaying on the first display area, a map of a geographic location; displaying on the second display area a plurality of categories for filtering of the plurality of geographic objects with the plurality of categories being grouped according to context information; and changing the display of the plurality of geographic objects on the first display area, in response to detection of a first input gesture on the second display area, wherein, for example, the second display area is proximate to a user's thumb for facilitating performing of the first input gesture using one-handed interaction.

20 Claims, 16 Drawing Sheets

1000

MAPPING APPLICATION FOR INTUITIVE INTERACTION

TECHNOLOGICAL FIELD

An example embodiment of the present invention relates to providing an intuitive interaction on a mapping application, and more particularly, to providing a user interface for enabling intuitive one-handed navigation, for example, on a user interface for a multi-level venue mapping application.

BACKGROUND

Mapping applications have become a useful tool in many user navigation applications. One such application is navigation within a multi-level venue such as a shopping mall, a hypermarket, a multi-level parking garage, an airport, a sporting venue and the like. Within the multi-level venue, such as a mall, a map of the entire mall, such as a venue map can provide information related to the different outlets within the mall, on each floor. Such a venue map can provide a detailed view of each floor of the mall using a map based user interface. Generally, within the shopping mall, a user can access such a venue map on their mobile device to learn about and navigate to a preferred destination, such as a specific brand store within the mall. While in the mall, the user is more likely to be carrying a lot of load, such as multiple shopping bags in their hands while moving through and shopping in the mall.

Current mapping applications may not be able to provide an intuitive user interface which may be well suited to the design of a display, such as a screen, of the user's mobile device. Such mapping applications may depict outlets in the venue with shapes that may need user to perform several gestures, such as panning, zooming, scrolling, tilting and the like, which may be not achievable using one-handed interaction with the user interface.

BRIEF SUMMARY

There exists a need in the art for an intuitive mapping application user interface suitable for one-handed interactions.

A method, apparatus, and computer program product are provided in accordance with an example embodiment described herein for providing an intuitive user interface for a mapping application on a computing device. The mapping application may include a map of a venue, such as an indoor venue. The indoor venue may include such as, a multi-level shopping mall, an airport, a hypermarket, a supermarket, a sporting event venue, and the like. The map of the venue may be accessed by a user while being present at the venue using a computing device. For example, user may be shopping in a mall, and may access a map of the mall on their mobile phone to get information about various shops on various floors of the mall.

In some example embodiments, a method may be provided for displaying a mapping application user interface of a computing device. The mapping application user interface may comprise at least a first display area and a second display area. The method may include: displaying on the first display area, a map of a geographic location, the map comprising a plurality of geographic objects; displaying on the second display area, a plurality of categories for filtering of the plurality of geographic objects, wherein the plurality of categories are grouped according to a context information for displaying on the second display area; and changing the display of the plurality of geographic objects on the first display area, in response to detection of a first input gesture on the second display area, wherein the second display area is proximate to a user's thumb for facilitating performing of the first input gesture using one-handed interaction with the computing device.

In some example embodiments, the methods may further include: performing a second input gesture on one of the plurality of categories displayed on the second display area, wherein performing the second input gesture comprises selecting the one of the plurality of categories by performing the second input gesture; changing the display of the plurality of geographic objects on the first display area to display the geographic objects associated with the selected category from the plurality of categories on the first display area, in response to detection of the second input gesture on the second display area; and changing the display on the second display area to display a plurality of labels corresponding to the plurality of geographic objects associated with the selected category, in response to detection of the second input gesture on the second display area.

In some example embodiments, the method may further include: performing a third input gesture on one of the plurality of labels displayed on the second display area, wherein performing the third input gesture comprises selecting the one of the plurality of labels by performing the third input gesture; changing the display on the first display area to display an enlarged view of a geographic object associated with the selected one of the plurality of labels, in response to detection of the third input gesture on the second display area; and changing the display on the second display area to display a plurality of text items corresponding to the selected one of the plurality of labels, in response to detection of the third input gesture on the second display area.

Embodiments disclosed herein may provide an apparatus including a mapping application user interface comprising at least a first display area and a second display area; at least one processor; and at least one memory including computer program code for one or more programs, the at least one memory and the computer program code configured to, with the at least one processor, cause the apparatus to perform at least the following: display on the first display area, a map of a geographic location comprising a plurality of geographic objects; display on the second display area, a plurality of categories for filtering of the plurality of geographic objects, wherein the plurality of categories are grouped according to a context information for displaying on the second display area; and change the display of the plurality of geographic objects on the first display area, in response to detection of a first input gesture on the second display area, wherein the second display area is proximate to a user's thumb for facilitating performing of the first input gesture using one-handed interaction with the apparatus.

According to some example embodiments, the apparatus may optionally be caused to: receive a second input gesture on one of the plurality of categories displayed on the second display area, wherein receiving the second input gesture causes selection of the one of the plurality of categories; change the display of the plurality of geographic objects on the first display area to display the geographic objects associated with the selected category from the plurality of categories on the first display area, in response to reception of the second input gesture on the second display area; and change the display on the second display area to display a plurality of labels corresponding to the plurality of geographic objects associated with the selected category, in response to reception of the second input gesture on the second display area.

According to some example embodiments, the apparatus may optionally be caused to: receive a third input gesture on one of the plurality of labels displayed on the second display area, wherein receiving the third input gesture causes selection of the one of the plurality of labels; changing the display on the first display area to display an enlarged view of a geographic object associated with the selected one of the plurality of labels, in response to reception of the third input gesture on the second display area; and changing the display on the second display area to display a plurality of text items corresponding to the selected one of the plurality labels, in response to reception of the third input gesture on the second display area.

A computer program product may be provided including at least one non-transitory computer-readable storage medium having computer-executable program code instructions stored therein. The computer-executable program code instructions may include program code instructions to: display a first display area to display a plurality of geographic objects; display a second display area to display a plurality of categories for the plurality of geographic objects, wherein the plurality of categories are grouped according to a context information on the second display area; and change the display of the plurality of geographic objects on the first display area according to a first input gesture on the second display area, wherein the second display area is proximate to a user's thumb for facilitating performing of the first input gesture using one-handed interaction.

In each of the embodiments, the first input gesture, the second input gesture, and the third input gesture may include one or more gestures for facilitating one-handed interaction of the user with the computing device. The one-handed interaction may be performed using one or more fingers, such as, the thumb, on the mapping application user interface.

In each of the embodiments, the second display area may be positioned on a bottom portion of the mapping application user interface, such that the second display area is in proximity to the user's finger for facilitating one-handed interaction of the user with the computing device.

BRIEF DESCRIPTION OF THE DRAWINGS

Figure 1:
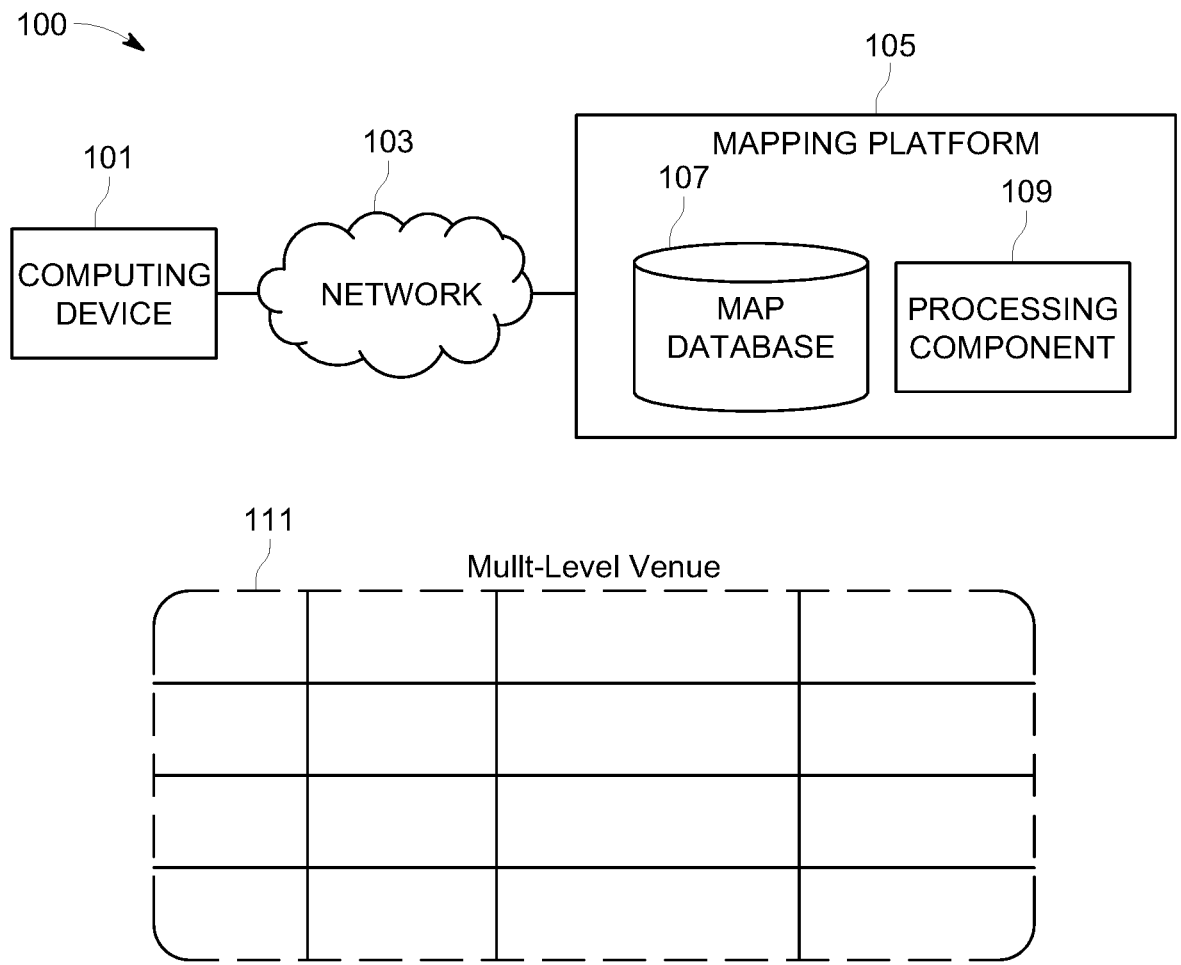
Figure 2A:
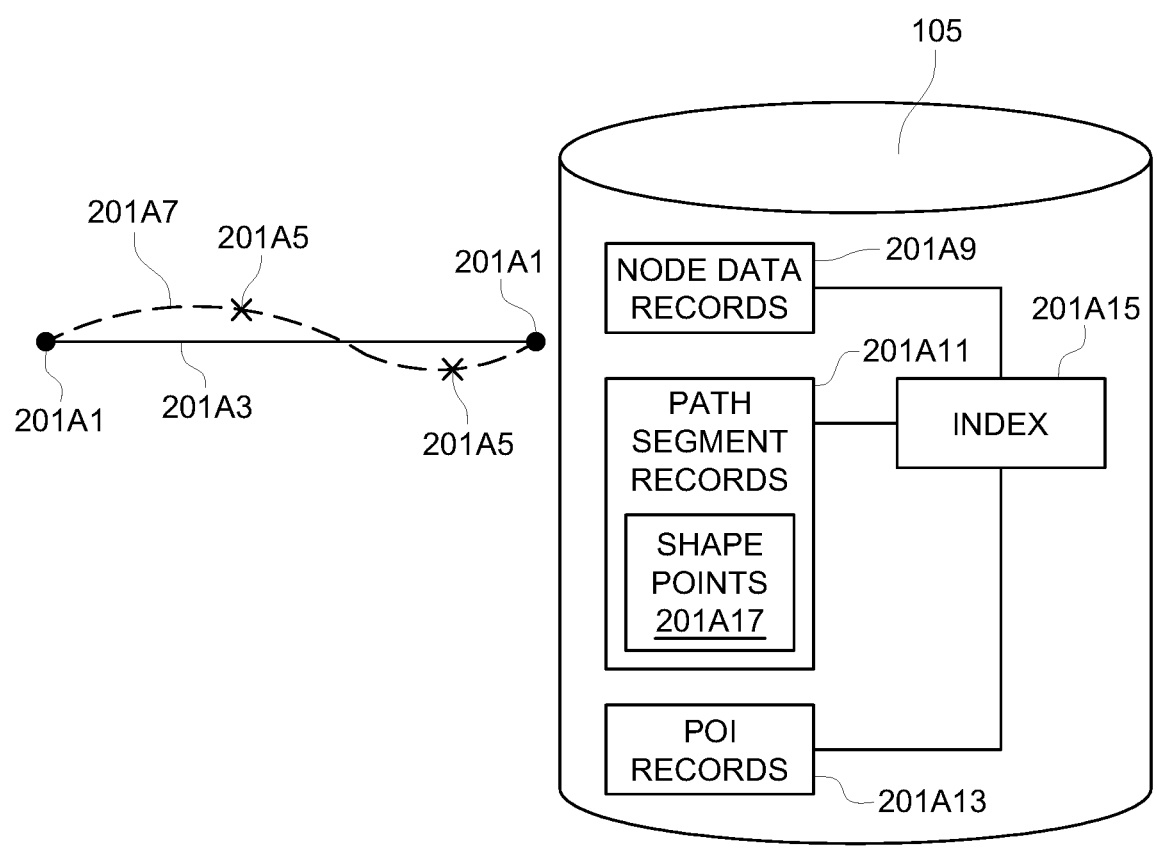
Figure 2B:
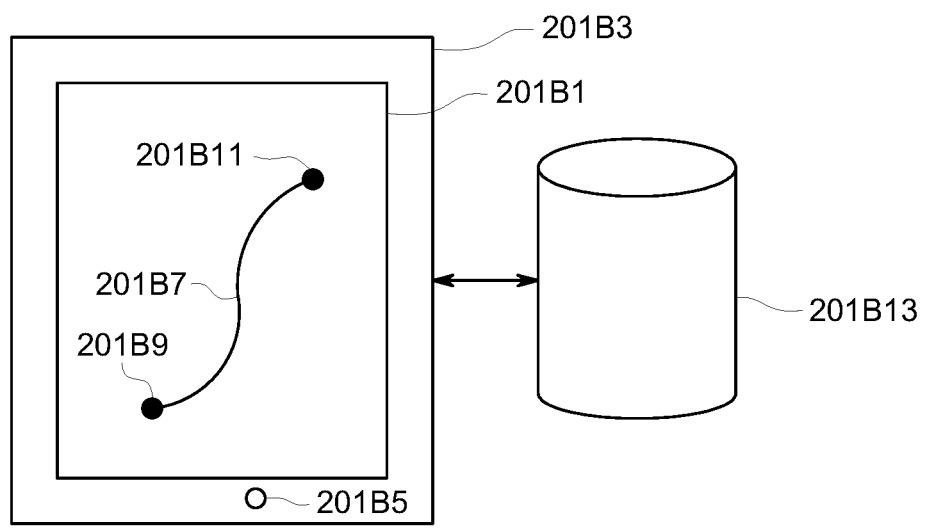
Figure 3:
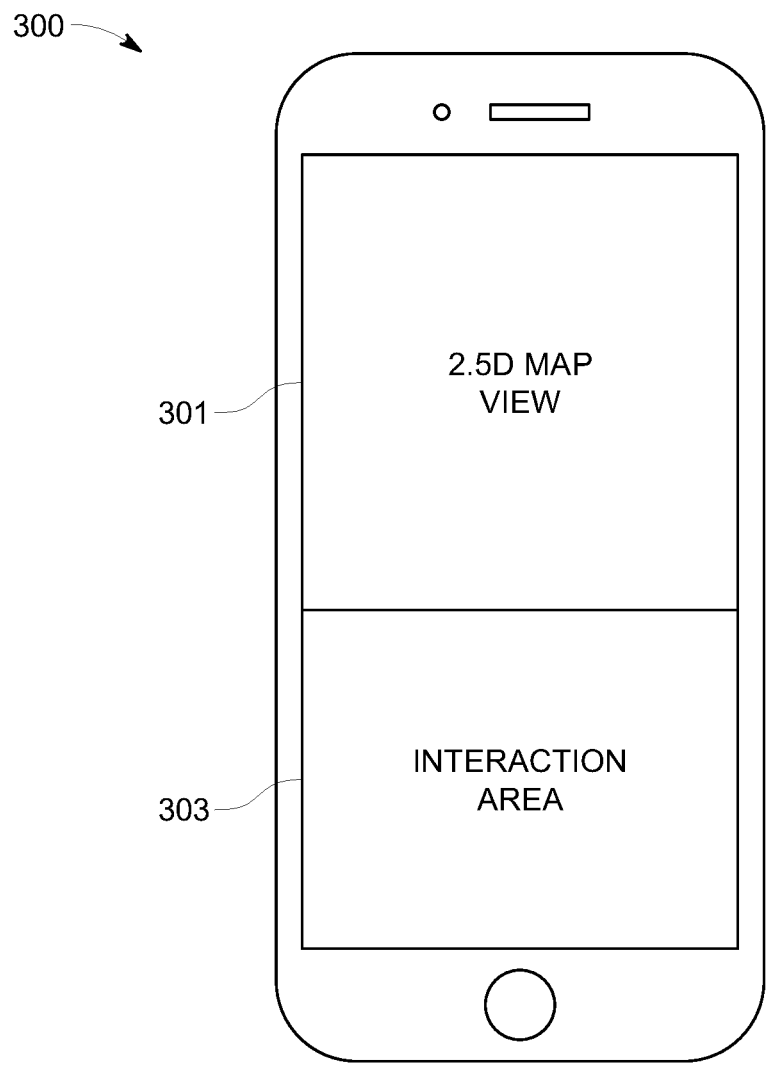
Figure 4:
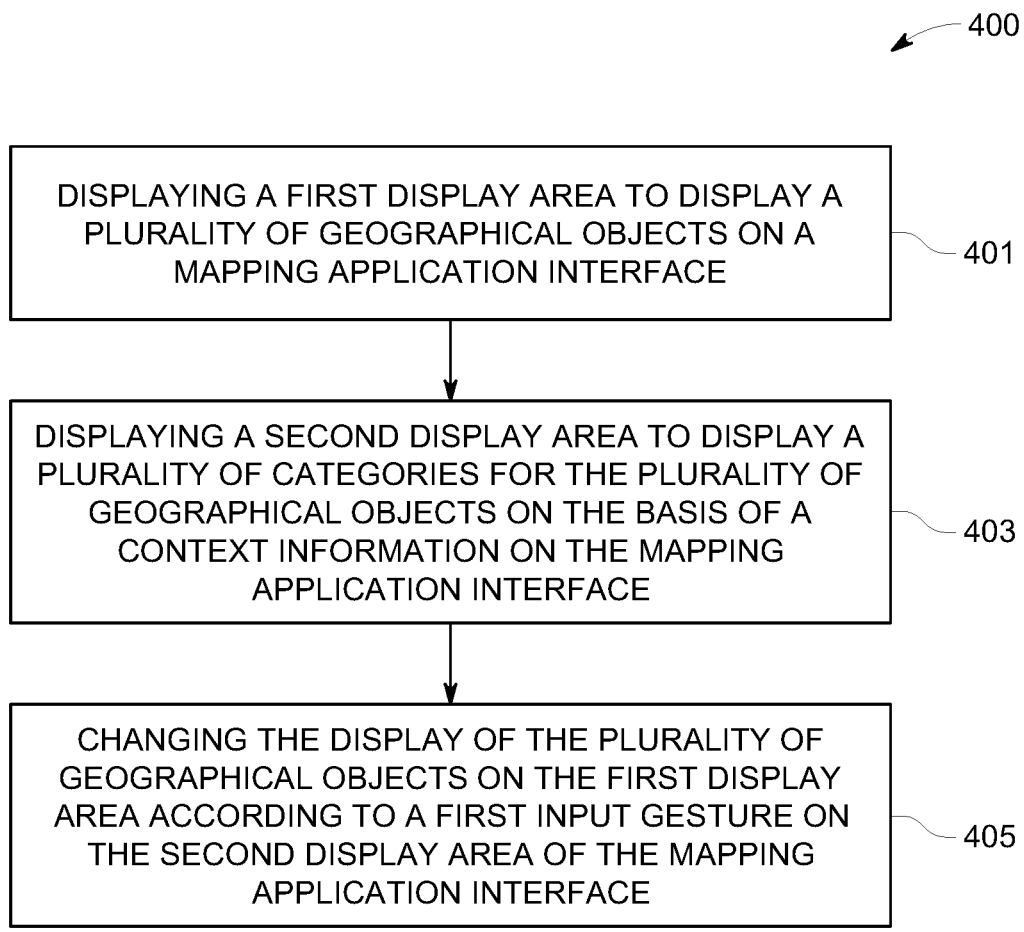
Figure 5:
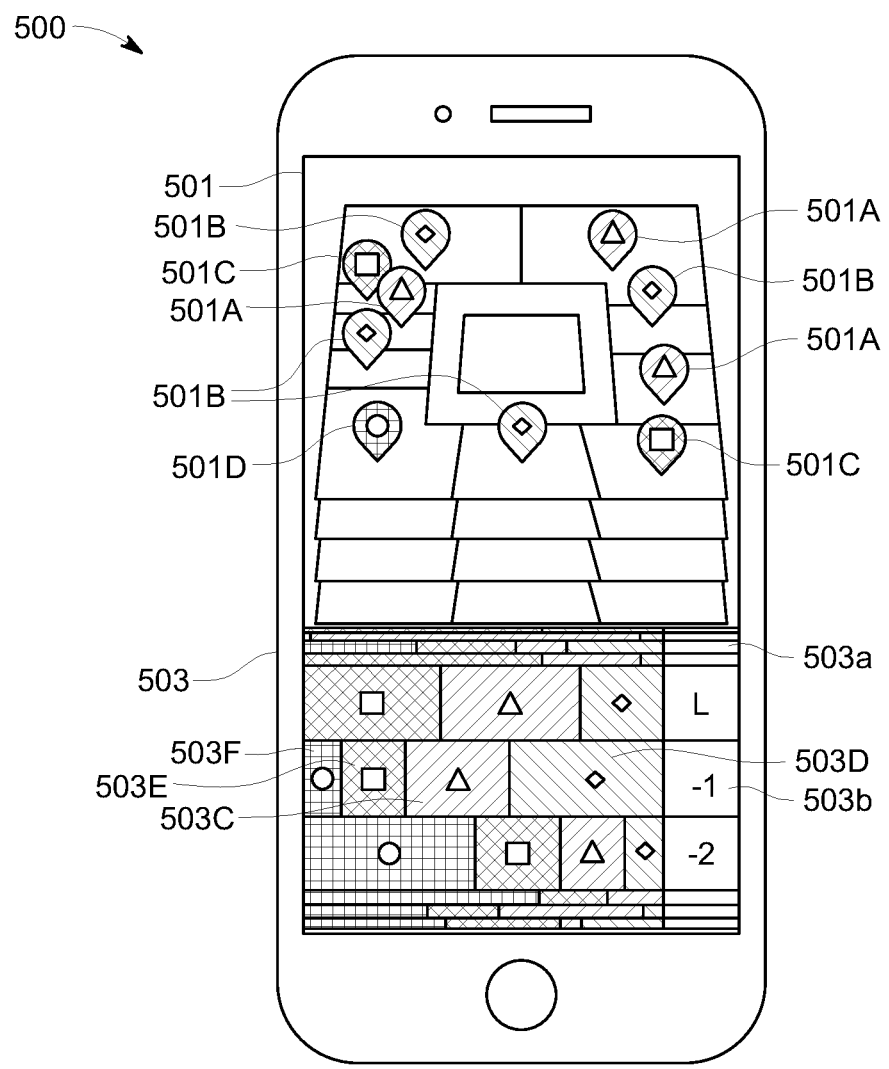
Figure 6A:
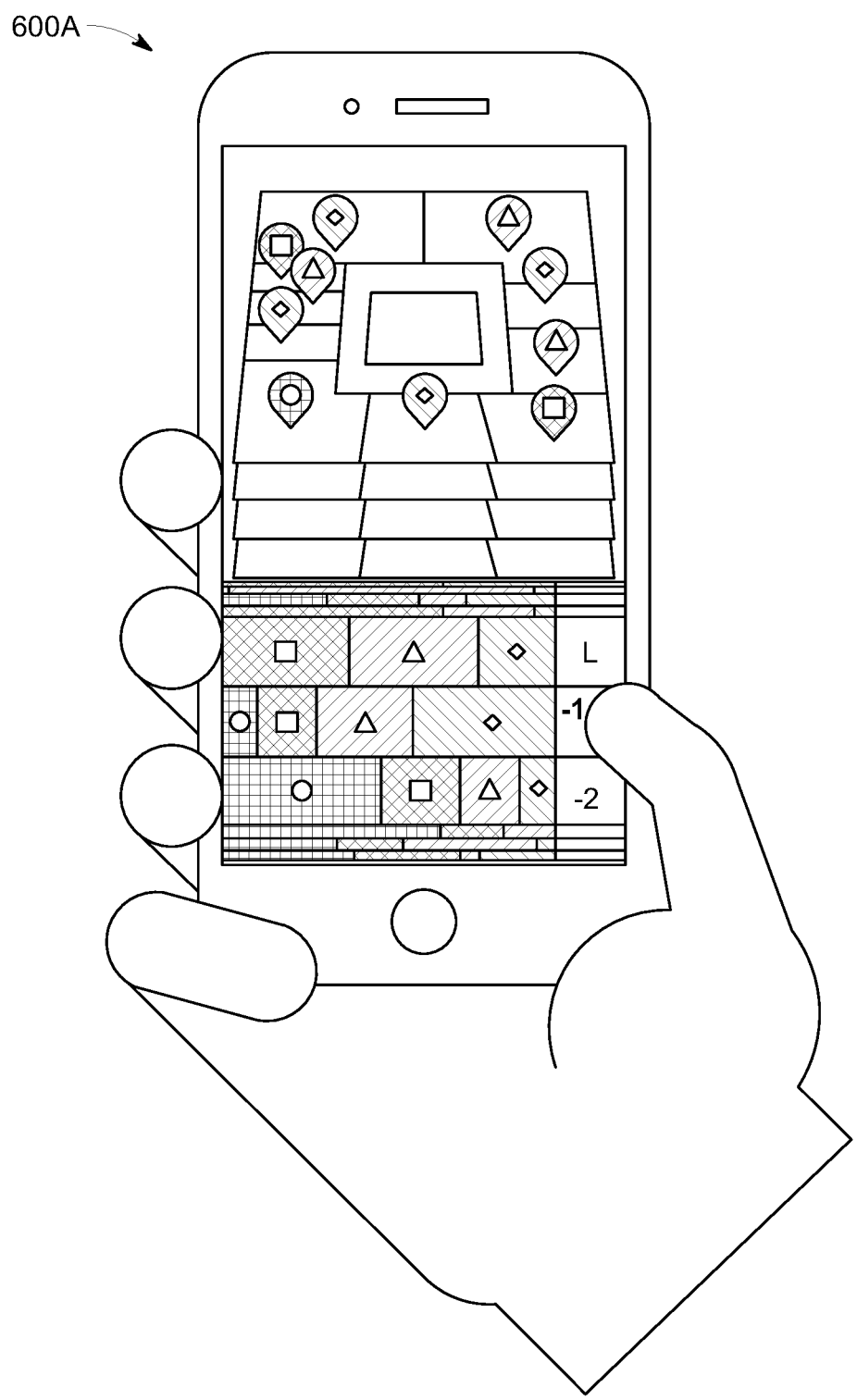
Figure 6B:
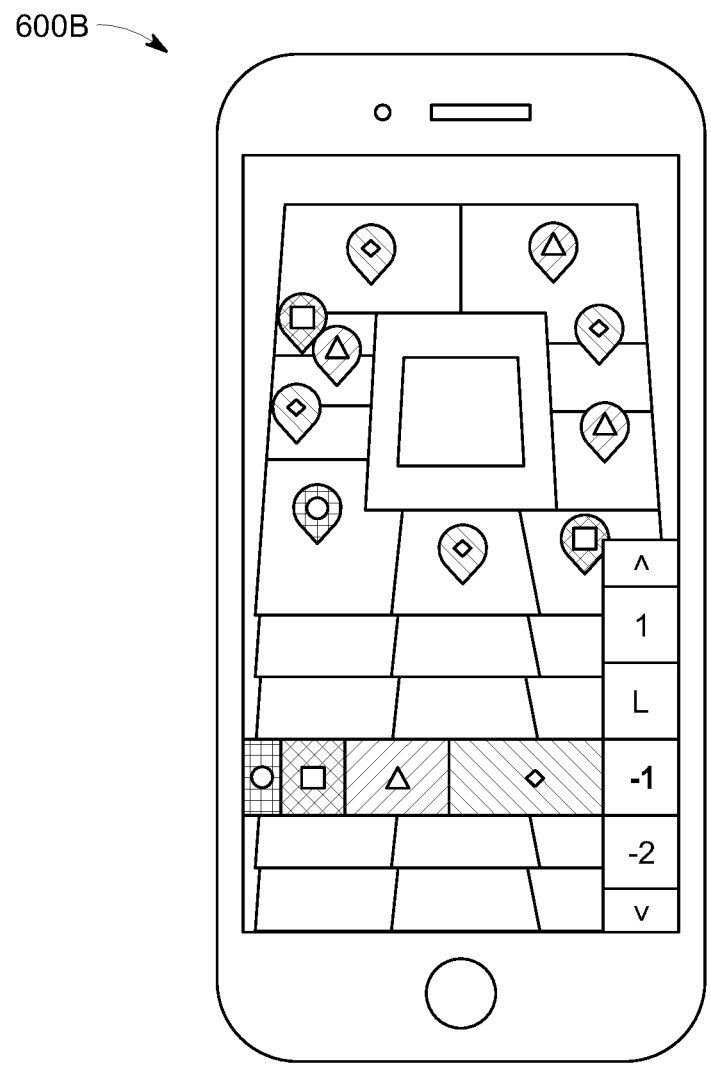
Figure 7:
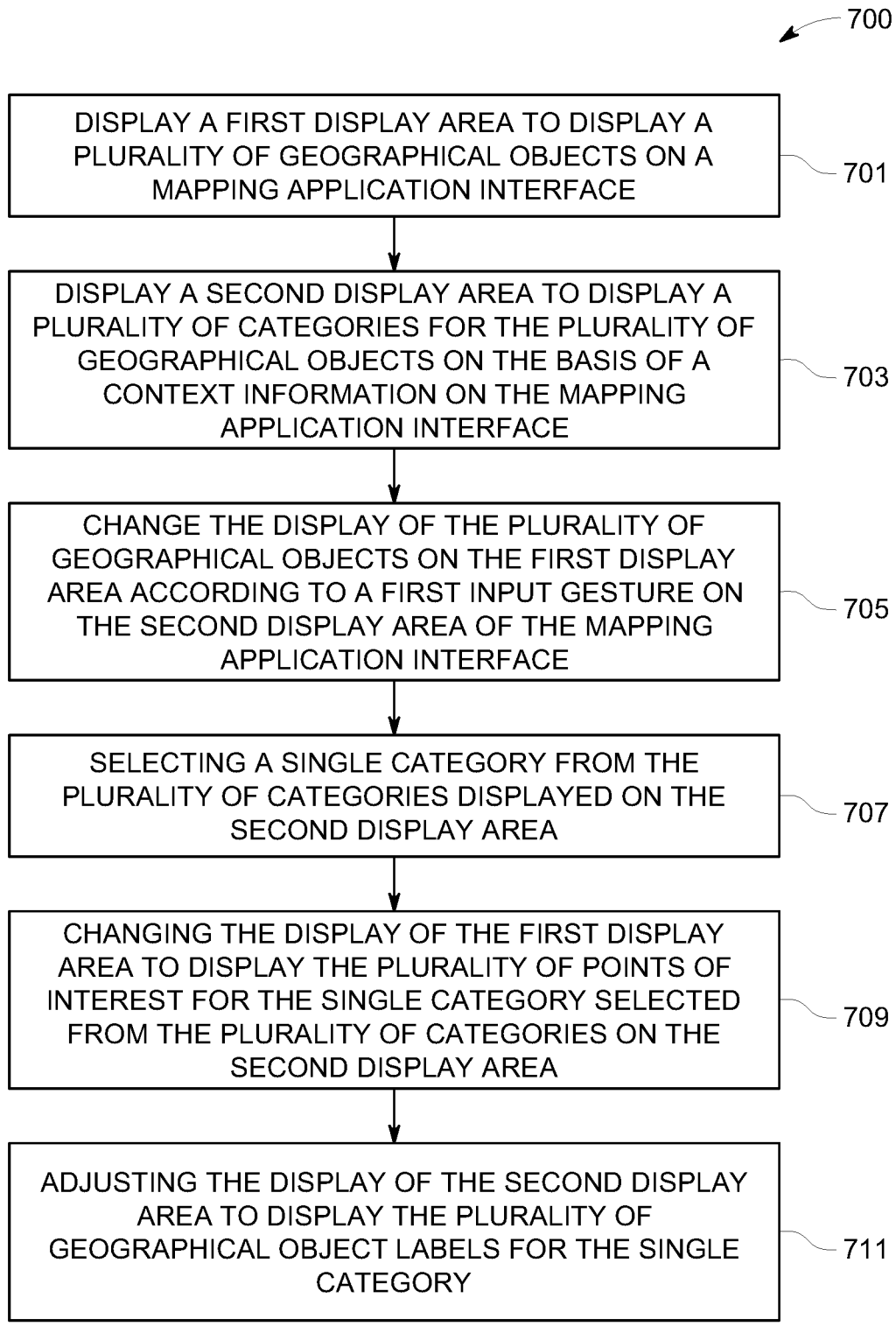
Figure 8A:
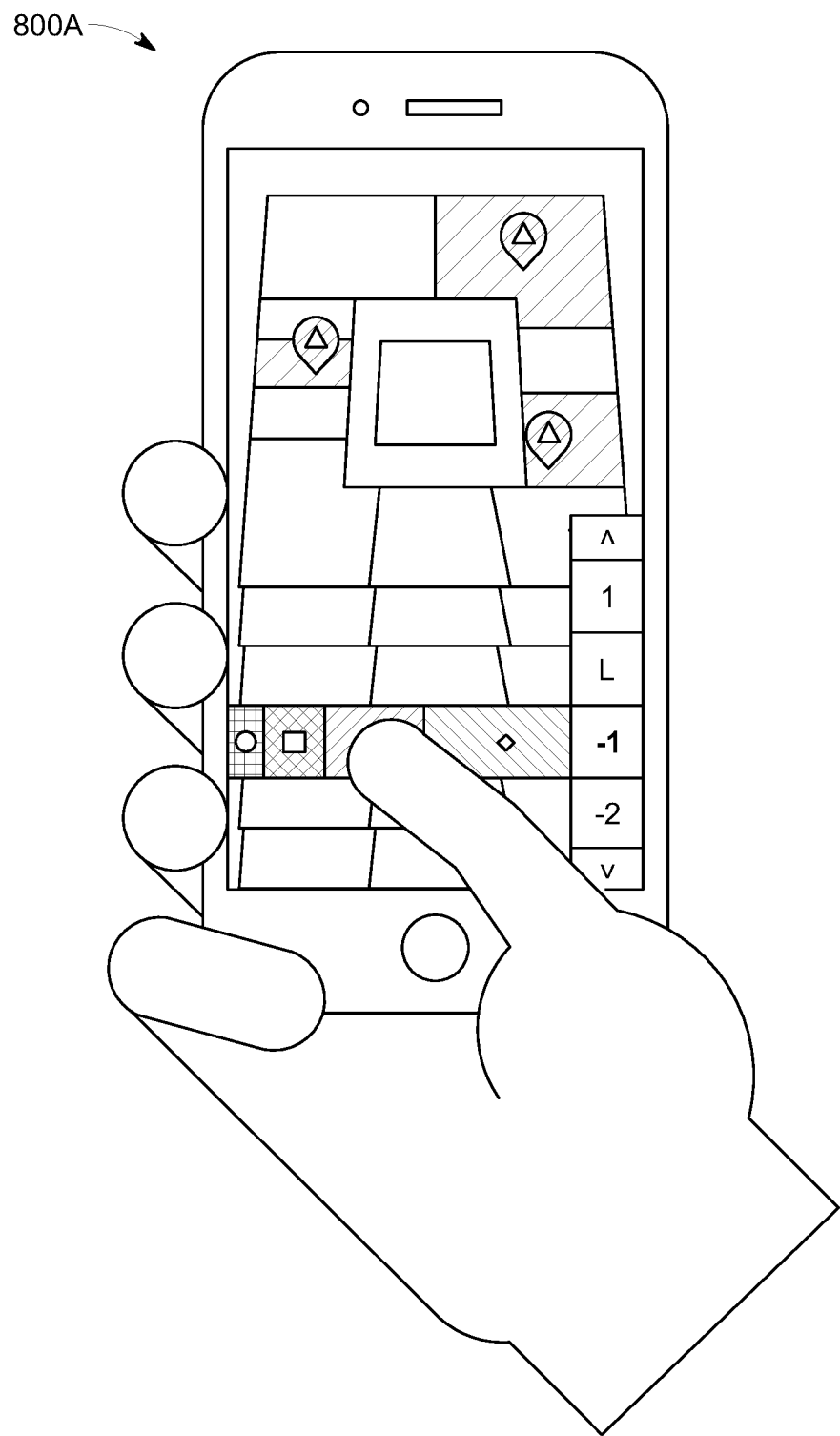
Figure 8B:
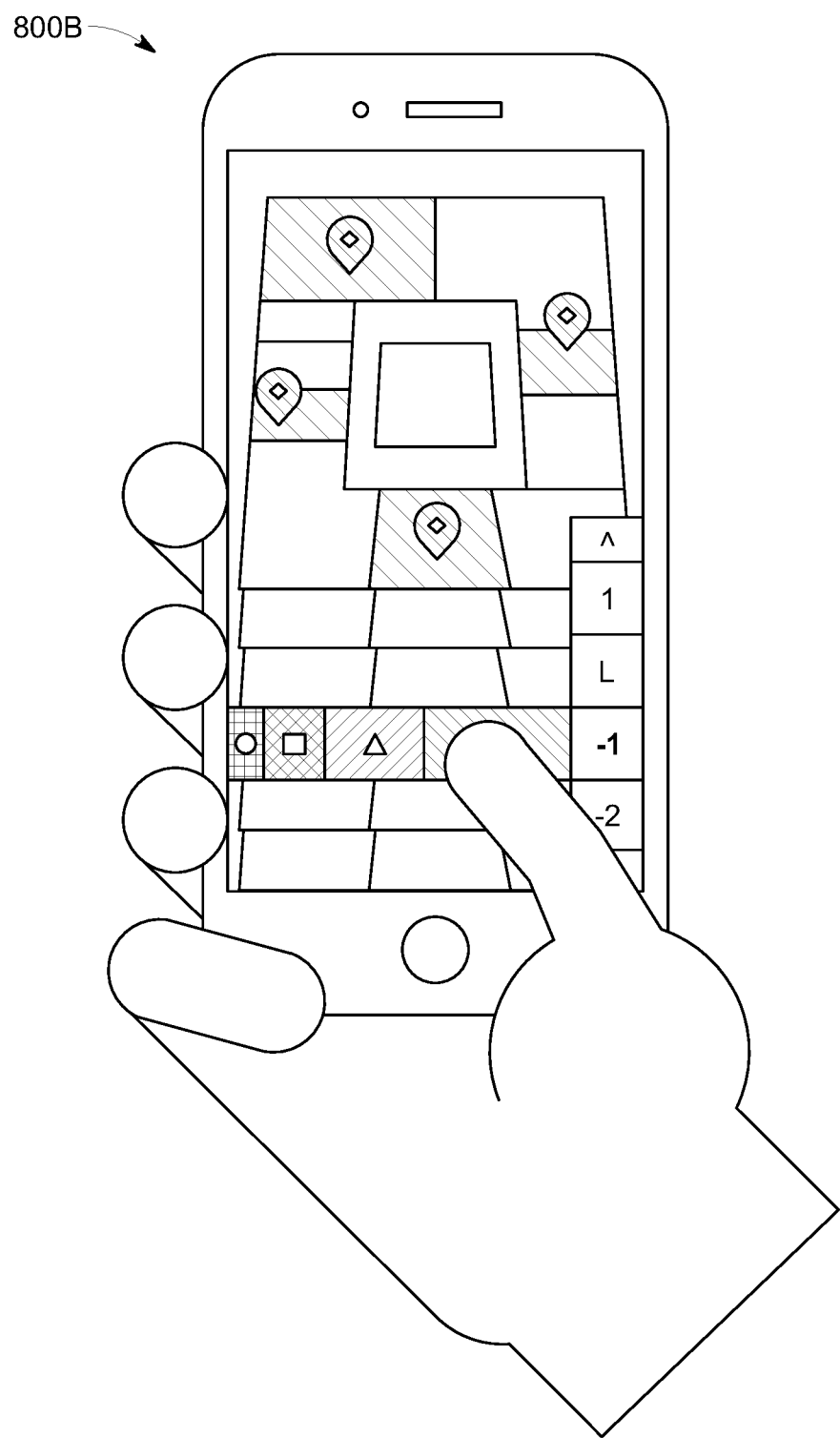
Figure 9A:
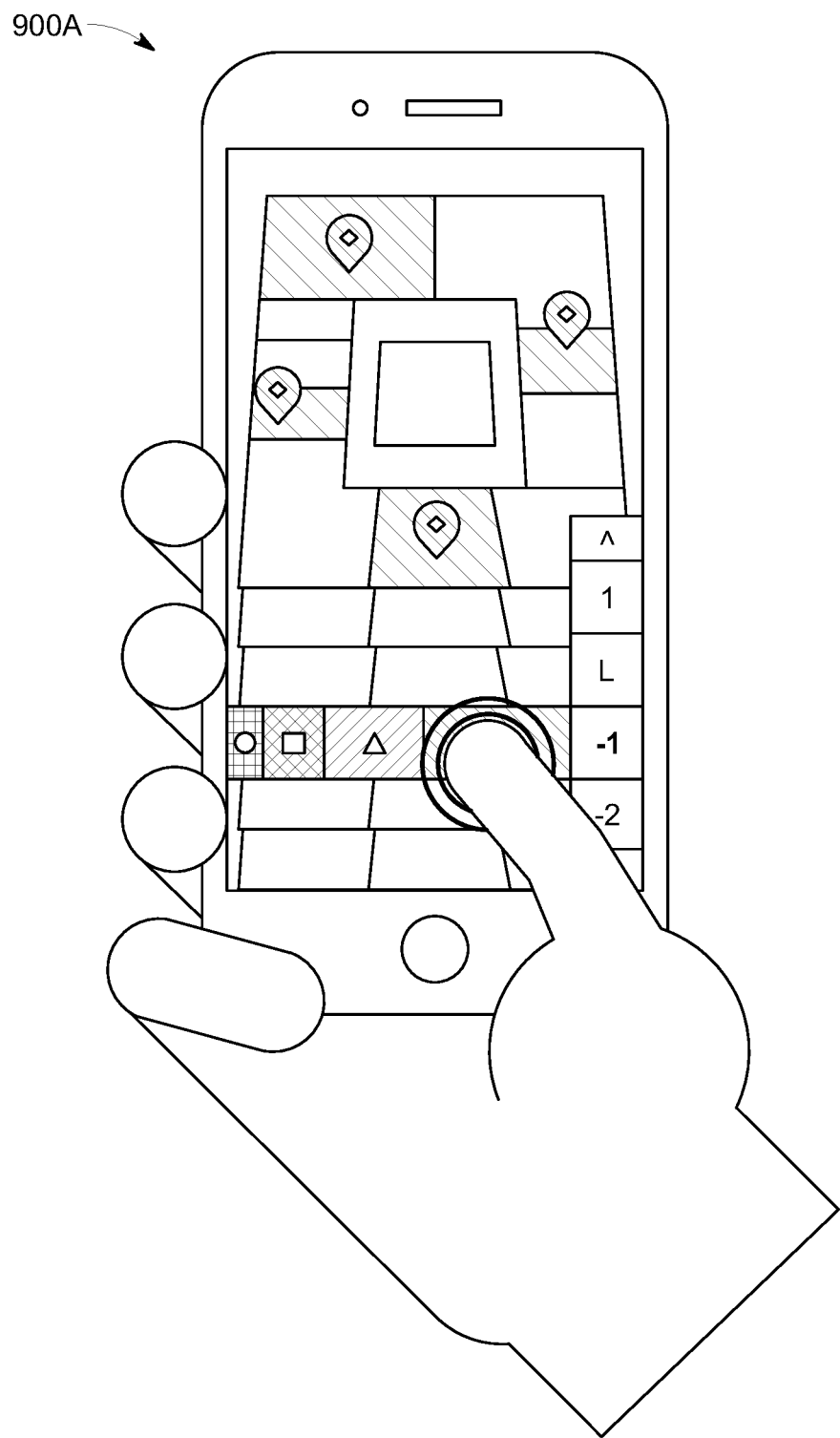
Figure 9B:
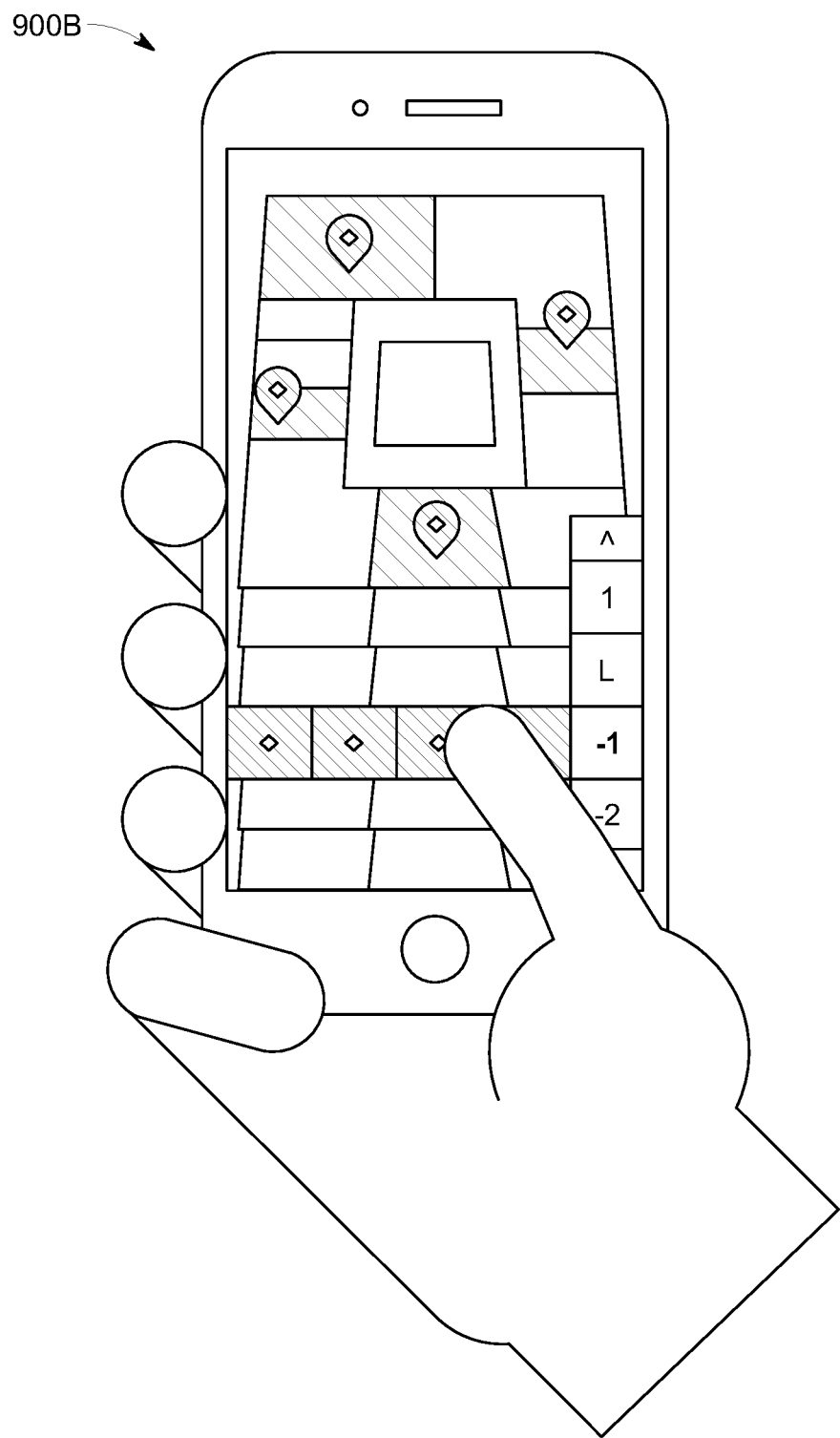
Figure 9C:
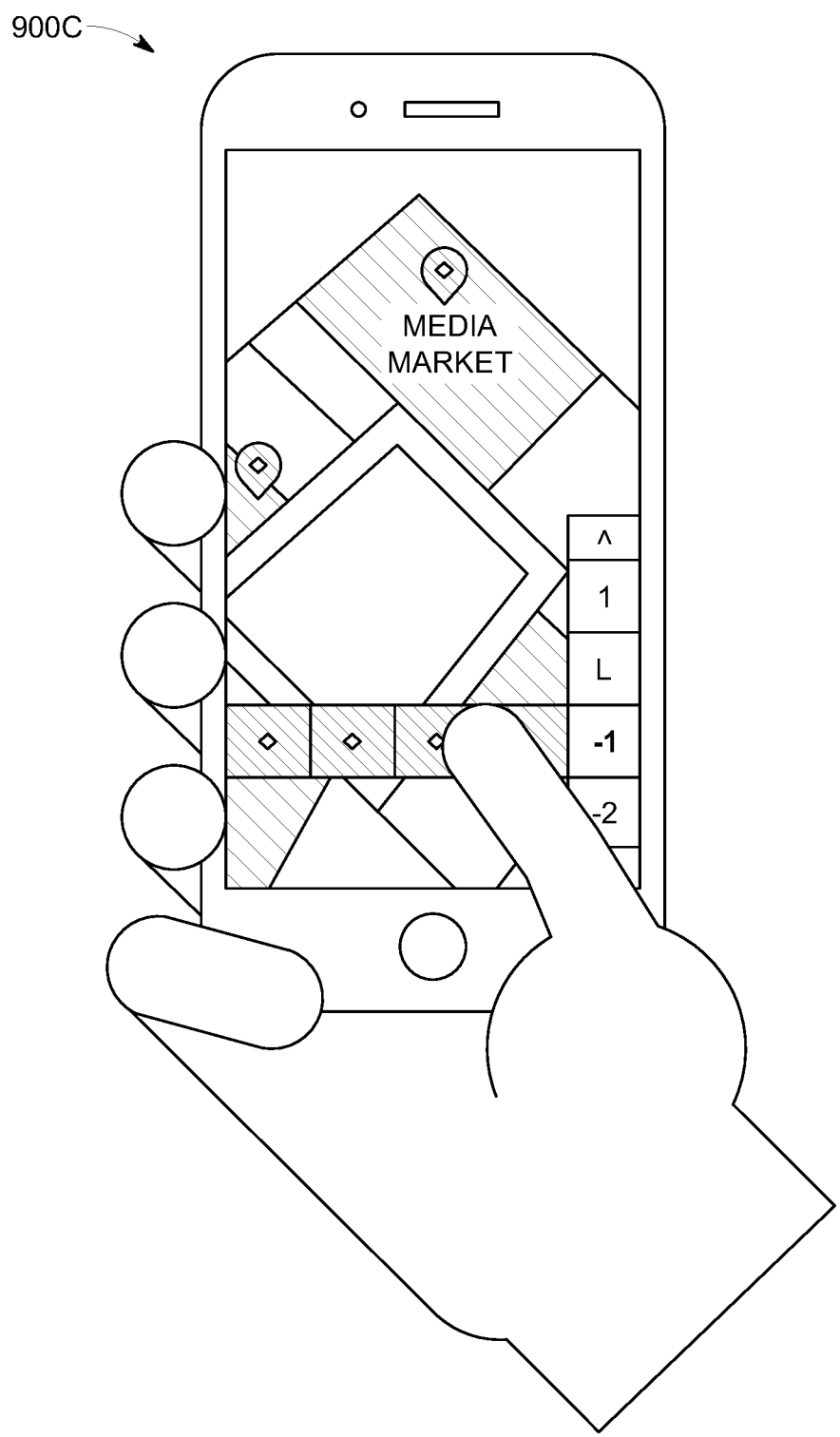
Figure 10:
Figure 10:
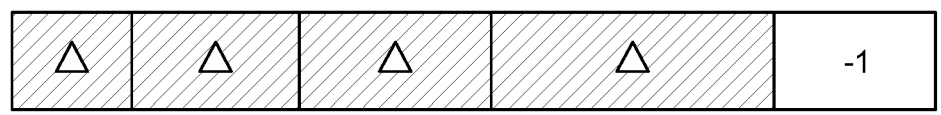
Figure 10:
Figure 11:
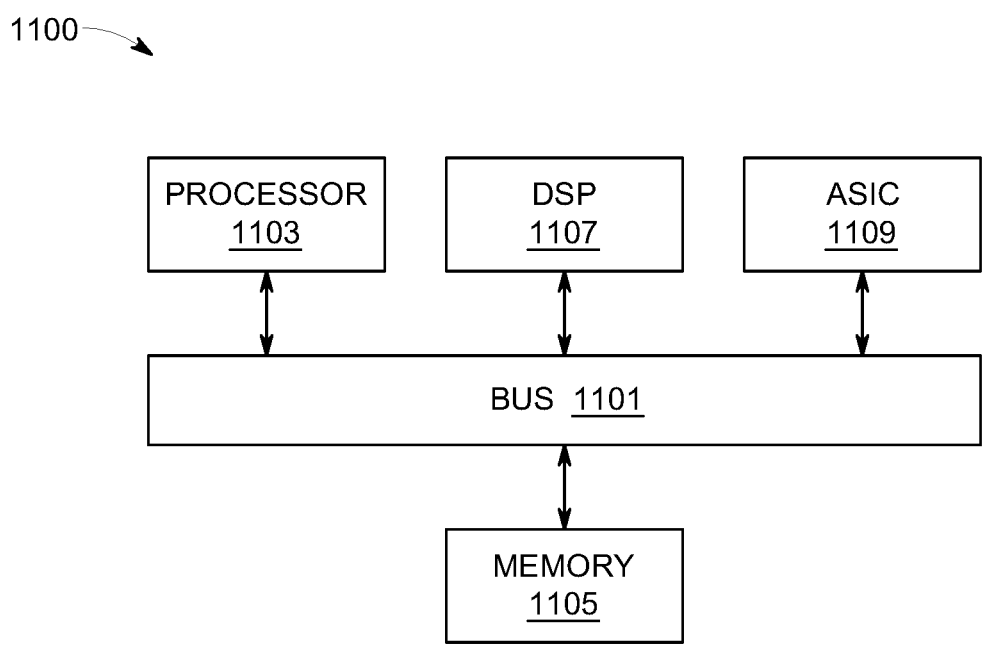
Figure 12:
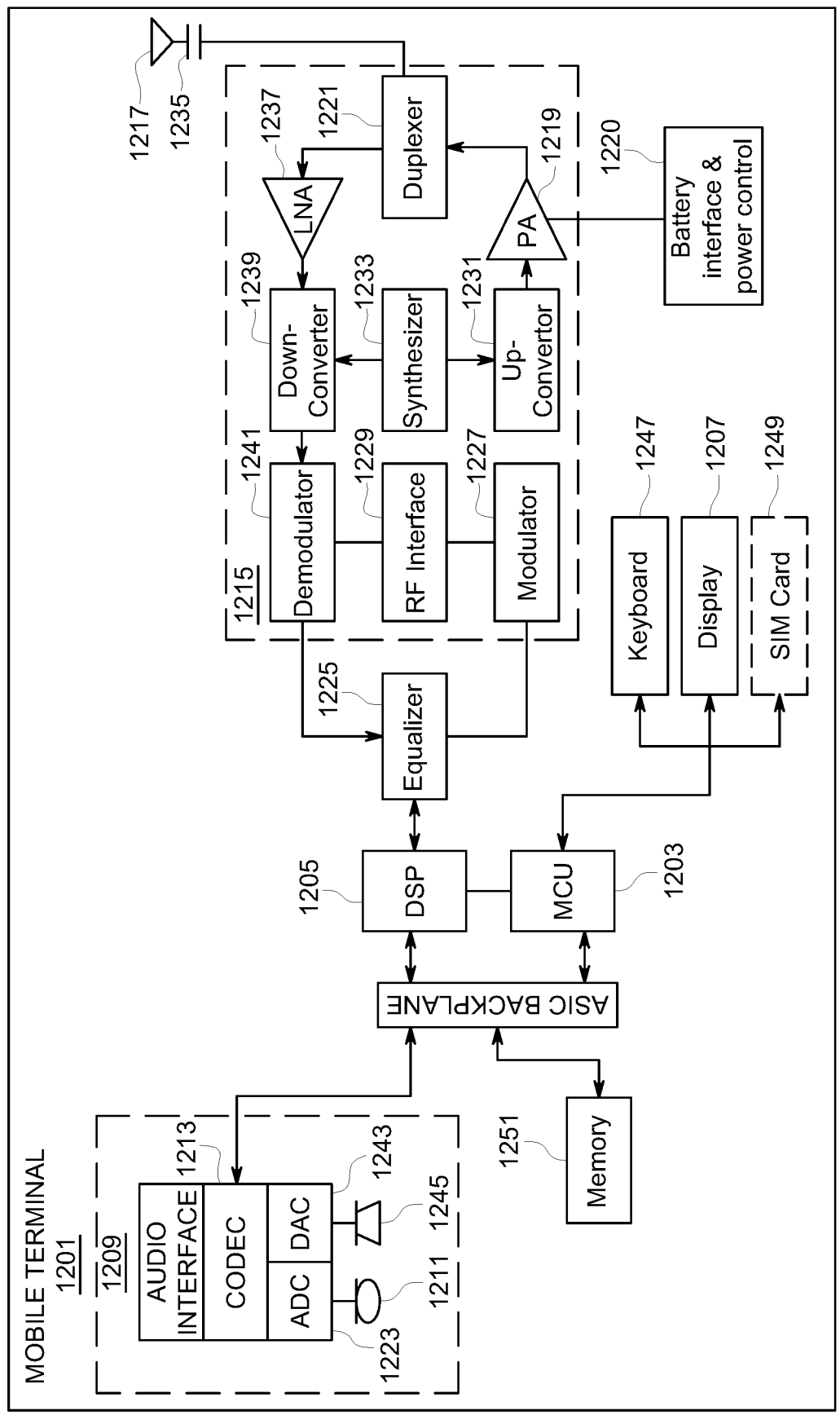

Having thus described example embodiments of the invention in general terms, reference will now be made to the accompanying drawings, which are not necessarily drawn to scale, and wherein:

FIG. 1 illustrates a diagram of a system for displaying a mapping application interface in accordance with an example embodiment;

FIGS. 2A-2B illustrate exemplary block diagrams of data records stored in a platform that may be used for providing data for a mapping application in accordance with an example embodiment;

FIG. 3 illustrates an exemplary interface including a first display area and a second display area for the mapping application according to an example embodiment;

FIG. 4 illustrates a flow diagram of a method for displaying the mapping application interface according to an example embodiment;

FIG. 5 illustrates an exemplary interface including a first display area and a second display area and depicting an interaction with the mapping application interface according to the method of FIG. 4 according to an example embodiment;

FIGS. 6A-6B illustrate exemplary interfaces for depicting an interaction with the mapping application interface according to the method of FIG. 4 according to an example embodiment;

FIG. 7 illustrate a flow diagram of another method for displaying the mapping application interface according to an example embodiment;

FIGS. 8A-8B illustrate exemplary interfaces for depicting an interaction with the mapping application interface according to an input gesture according to an example embodiment;

FIGS. 9A-9C illustrate exemplary input gestures for depicting an interaction with the mapping application interface according to an example embodiment;

FIG. 10 illustrates exemplary information displayed on the second display area on the basis of performing an input gesture on the second display area according to an embodiment;

FIG. 11 is a diagram of a chip set that can be used to implement an embodiment of the invention; and FIG. 12 is a diagram of a mobile device that can be used to implement an embodiment of the invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus, and computer program product are provided herein in accordance with an example embodiment for providing an intuitive user interface for enabling one-handed interaction with a mapping application, such as multi-level venue mapping application. The multi-level venue mapping application may be configured to provide a multi-level venue map or indoor map of a multi-level venue such as a shopping mall. Such a shopping mall may have different stores of various categories, such as restaurants, electronic stores, apparel stores, book stores and the like on each level or floor of the mall. A user who is walking through the mall may find it useful to find all the information about all the stores in the mall, organized level by level, on their computing device. They can then use the map of the store to find a store of their choice move to that level on the mall.

Multi-level venue maps may be accessed using a computing device, such as a mobile device. In a scenario of a multi-level venue, such as a mall, a user may prefer to use one-handed gestures for accessing the mapping application, such as the multi-level venue map.

FIG. 1 illustrates a diagram of a system for accessing a mapping application interface in accordance with an example embodiment.

The system 100 of FIG. 1 may include a computing device 101 for displaying a mapping application, such as a map of a multi-level venue 111 on a user interface of the computing device 101. The map of the multi-level venue 111 may be accessed from a mapping platform 105 over a network 103. The mapping platform 105 may include a map database 107 for storing various components of map data and a processing component 109 for accessing the various components of the map data using the map database 107. The map database 107 of the mapping platform 105 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user mapping application interfacing systems. The data may be accessed by sending a request to access the map database 107 over the network 111.

The network 103 may be wired, wireless, or any combination of wired and wireless communication networks, such as cellular, Wi-Fi, internet, local area networks, or the like.

The computing device 101 may include a mobile computing device such as a laptop computer, tablet computer, mobile phone, smart phone, navigation unit, personal data assistant, watch, camera, or the like. Additionally or alternatively, the computing device 101 may be a fixed computing device, such as a personal computer, computer workstation, kiosk, office terminal computer or system, or the like.

In an example embodiment, the map of the multi-level venue 111 may be downloaded from the mapping platform 105 using the network 103.

In an example embodiment, the computing device 101 may establish a connection with the mapping platform 105 for accessing the map of the multi-level venue 111. The map of the multi-level venue 111 may then be displayed on a user interface of the computing device 101, such as on the display screen of a mobile device. Thereafter, the user interface of the computing device 101 displaying the map of the multi-level venue 111 may be used as a mapping application interface for accessing the map of the multi-level venue 111.

The mapping application may depict various types of data on the mapping application interface, which may be stored in the map database 107 of the mapping platform 105.

FIG. 2A illustrates a block diagram of a platform that may be used for providing data for a multi-level venue map in accordance with an example embodiment.

The platform may be such as the mapping platform 105 disclosed in FIG. 1. The mapping platform 105 may include a database, such as the database 107, which may include node data records 201a9, such as the records 201a1, path segment data records 201a11, such as the record 201a3, point of interest (POI) records 201a13, and an index 201a15. Additional, fewer, or different components may be provided. For example, cartographic ("carto") data records may be provided and other data records such as, but not limited to, routing data and maneuver data may also be included.

The path segment data records 201a11 are links or segments representing portions of roads, streets, floors, alleys and/or paths (such as paths modeled or used in an open area). The path segment records 201a11 may include shape point records 201a17, such as the shape points 201a5. The shape points or shape point attributes 201a5 are used to represent a curve or curvature 201a7 that represents that portion of a route or link in more detail rather than a simple line (e.g., the shape points identify a certain shape of a path represented by a link). For example, the shape points 201a7 help reflect or identify a truer representation of the route portion by acting as guide points for curve fitting.

The node data records 201a9 are end points corresponding to the respective links or segments of the segment data records 201a11. For example, the node data records may represent intersection points. The POI data records 201a13 correspond to data or information regarding geographical objects, such as restaurants, apparel stores, coffee shops, tech shops, bookstores, stadiums, offices, automobile dealerships, auto repair shops, buildings, stores, fountains, indoor and/or outdoor structures, parks, lobbies, cafeterias, meeting spots, destinations, etc. The map database 107 may include data about the locations of these POIs on the different floors of an indoor venue, such as a shopping mall. The map database 107 may also include data about places, such as cities, towns, or other communities, and other geographic features, such as bodies of water, mountain ranges, etc. Such place or feature data may be POI data or may be associated with POIs or POI data.

The nodes 201a9 and/or shape points 201a17 may be associated with node IDs or shape point IDs, respectively, by which the record can be identified in the map database 107. The segments 201a11 may be associated with segment IDs by which the record can be identified by the map database 107. Also, the segment data records 201a11 may also include data identifying the endpoints of the segments, the respective node records, and the location of the endpoints. Other data, such as field or category data or IDs, may be provided.

The path segment, node, POI, and/or other records may be associated with attributes, such as geographic coordinates (such as latitude, longitude, and/or altitude or other coordinates), other positioning information (such as local or indoor positioning data), store location, opening hours, popularity, ranking, location or structure names, other rating or time information and navigation related attributes. For example, the nodes 201a9 and/or shape points 201a17 may be associated with coordinates or other position information. The links 201a11 may be associated with distance or length information and/or speed or time information, such as an average time or other time it takes to traverse that particular segment. The POI records or POI attributes 201a13 as well as other data records may be associated with the node data 201a9 and the path segment data 201a11 via the index 201a15 and/or other means. The index 201a15 may be one or more indexes or data structures that organizes and/or links the different data records with each other.

FIG. 2B illustrates a mobile device 201b1 and a database 201b13. For example, the device 201b1 is an end user device, such as the device 101 or other device. The device 201b1 includes, but is not limited to, a display 201b3 and an input device 201b5. Fewer, additional, or different components may be provided.

The display 201b3 is any mechanical and/or electronic display positioned for accessible viewing in, on, or in communication with the device 201b1. For example, the display 201b3 is a touch screen, liquid crystal display ("LCD"), cathode ray tube ("CRT") display, a plasma display, or other display. The display 201b3 may act as a hardware implementation of a user interface or a portion thereof. The input device 201b5 may be one or more buttons, keypad, keyboard, mouse, stylist pen, trackball, rocker switch, touch pad, voice recognition circuit, or other device or component for controlling or inputting data in one or more of the components of the device 201b1.

The device 201b1 is in communication with the database 201b13. For example, the database 201b13 is the geographic and/or map database 107 or a similar database. Or, the database 201b13 is a compiled database derived from the map database 107. The database 201b13 may be external and/or remote to the device 201b1 in which communication occurs over a wireless and/or wired network (such as in a server system). Alternatively, the database 201b13 may be part of the device 201b1. In one embodiment, an end user enables the device 201b1 for routing purposes. For example, the end user wants to route from a current position or origin point 201b9 to a destination 201b11 within an indoor setting, an outdoor setting, or a combination thereof. The device 201b1 generates a route 201b7 by accessing path segment records (such as the data records 201a11), node records (such as the node records 201a9), and/or other data records in the database 201b13 (e.g., when selecting the destination 201b11, a POI record may have been accesses and/or retrieved). For example, based on a routing algorithm, different path segments and/or nodes are retrieved to create the path from point 201b9 to point 201b11. The route 201b7 is then displayed on the display 201b3. Accordingly, segment records, node records, and/or other records created from open area maps (as described above) are used for navigation functions. Routes or travel paths generated by open area map technology (such as mesh, grid, and/or tile associations) are modeled and stored for traditional link-node routing (i.e., for example, instead of using the open area map technology to route, nodes, links, and/or other data records are accessed (such as via a routing algorithm) to generate a route).

In some example embodiments, the routes and maps generated by the map database 201b13 may be used to display the map of a multi-level venue on the mapping application user interface disclosed herein.

FIG. 3 illustrates an exemplary interface including a first display area and a second display area for the mapping application according to an example embodiment.

The interface 300 of FIG. 3 may include a mapping application user interface, which may include a map of a multi-level venue displayed on a display screen of a computing device, such as the computing device 101. In some example embodiments, the computing device 101 may be a mobile phone. The mapping application interface 300 is divided into two sections, a first display area 301 and a second display area 303.

In an example embodiment, the first display area 301 displays a map of an area, such as a multi-level venue. In an example embodiment, the map may be such as a 2.5D map. However, any other possible dimensional representation of the map may be used, such as 3D, 4D and the like, without limiting the scope of the invention. The multi-level venue may include a shopping mall, an airport, a hypermarket, a sporting venue, an amusement park, a multilevel office or factory building and the like. The 2.5D map may depict a plurality of geographical objects, such as a plurality of points of interest (POIs), on the mapping application interface 300. For example, in case the multi-level venue is a shopping mall, the 2.5D map may display a floor level view on the mall, depicting locations of various shops or stores on the floor as the POIs on the map of that particular floor. In case of a multilevel office, POIs may include various departments, workshops, inventory management sections, warehouses, tool houses and the like. The display of the plurality of POIs on the 2.5D map may be controlled on the basis of user interactions performed on the second display area 303. The second display area 303 may be used as an interaction area for providing an input gesture for controlling and adjusting the display of the plurality of POIs on the first display area 301. In addition, the 2.5D map in the first display area 301 may be dynamically rotated, tilted and zoomed based on the user's input in the interaction area. In an example embodiment, an input gesture in the first display area 301 may be used to adjust a view of the different categories on the second display area 303.

The second display area 303 may be almost always located at the easy-to-reach areas of the screen of the computing device 101. For example, for a right-handed person, the second display area 303 may be located at right-edges and the bottom third portion of the screen of the computing device 101. Thus, the second display 303 area may be configured to provide an intuitive access of the mapping application user interface 300 that is also easy to use.

In an example embodiment, the second display area 303 may be proximate to a user's thumb when they are holding the computing device. Thus, the second display area 303 may be accessed using input gestures that can be performed by one-finger (such as the thumb). These input gestures may include a press, a long press and a slide. Thus, the second display area 303 may enable one-handed interaction with the mapping application user interface 300 using these input gestures.

In an example embodiment, the second display area 303 may depict abstracted side-view of the different levels of a venue. For example, the levels may correspond to different floors of a multi-floor shopping mall in case the multi-level venue 111 is a shopping mall. The levels may be shown in the second display area 303 containing information based on POI categories and shops. The different levels and corresponding information for the multi-level venue 111 may be accessed by using the mapping application user interface 300 displayed on the computing device 101.

FIG. 4 illustrates a flow diagram of a method for displaying the mapping application user interface according to an example embodiment.

The method 400 includes, at 401, displaying a first display area to display a plurality of geographical objects, such as a plurality of points of interest (POIs) on a mapping application user interface. For example, the first display area 301 of the computing device 101 may be used to display a 2.5D map of a multi-level venue. The 2.5D map may provide a floor level view of the multi-level venue, with different stores on a floor and their locations depicted as the plurality of POIs.

The method 400 may further include, at 403, displaying a second display area to display a plurality of categories for filtering the plurality of geographic objects. The plurality of categories may be grouped for display on the second display area, such as the second display area 303 of the computing device 101 based on context information. In an example embodiment, the context information may be derived on the basis of a user's personalized information, such as user's choices, preferences, preferred shops for visiting and the like.

In an example embodiment, the context information may include information related to such as the density of some types of shops, the shops' size in relation to the floor's total size, the shops' relevance for a user based on various contextual criteria, the proximity of the shop or a particular geographical object to the user, the proximity of the shop or a particular geographical object to an access point such as lift or stairs and the like.

The context information may be derived based on past historical data, which may be stored such as in a storage module associated with the mapping application, such as the memory of the mobile device 101. In some other example embodiment, the context information may be retrieved from the mapping platform 105.

The context information may be used to organize and provide filters for the plurality of geographic objects, such as the POIs displayed on the 2.5D map, into categories, which may be displayed as bars or bar graphs of different colors on the second display area. Each color may correspond to a different category. For example, all the restaurants may be grouped into a single category and represented by red color. Further, if a user mostly visits a shopping mall for eating out, then such contextual information may be used to display the category corresponding to the restaurants on the rightmost end of the second display area 303 of the computing device 101 for this user, to enable quick one handed access. The user can then select the desired category by performing a first input gesture on the area or color indicating that particular category. The input gesture may include any of a press, a touch, a tap, a long press, a slide of a finger and the like. Once the user performs the input gesture, the method 400 may include, at 405, changing the display of the plurality of POIs, such as depicting locations of POIs on a level on the 2.5D map, on the basis of the first input gesture performed on the desired category on the second display area 303. The first input gesture may be performed using one-handed interaction with the second display area 303 as the second display area 303 is provided in proximity of the user's thumb, for accessing the interface of the second display area 303. For example, when the user selects a category in color red, such as restaurants, on the second display area 303, the 2.5D map in the first display area 301 displays locations of all the restaurants (POIs) on the selected level with red color towards the bottom of the screen of the computing device 101, which may be a mobile phone. The user can then use their thumb to select the red color category on the screen, in the second display area. The view of the first display area will then change accordingly. The changes on the mapping application user interface on the basis of input gestures may be depicted by the user interface diagrams illustrated in FIGS. 5 and 6.

FIG. 5 illustrates an exemplary interface including a first display area and a second display area and depicting an interaction with the mapping application user interface according to the method of FIG. 4 according to an example embodiment.

The interface of FIG. 5 displays a mapping application user interface 500 in which the first display area 501 provides 2.5D representation of a venue with a set of color-coded geographic objects or POIs 501*a*-501*d*. The second display area 503 displays a plurality of collapsed levels, 503*a*; a current level 503*b*; and different POI categories 503*c*-503*f*. The mapping application user interface 500 displays that in the second display area 503, level −1 is selected. In some example embodiments, these levels may correspond to the different floors of a multi-level venue, such as a shopping mall. The levels below and above the current level 503*b* are extended, the other levels are collapsed in the second display area so that the distribution of POI categories 501*a*-501*d* can be identified. In the example embodiment depicted in FIG. 5, the size, ordering, and color of the POI categories 503*c*-501*f* on the levels in the second display area 503 are based on amount of space they occupy in the level. However, other relevant parameters, in the form of context of POI related information, may also be used to indicate the size of the POI categories 501*a*-501*d* without deviating from the scope of the invention. Such relevant parameters may include, but are not limited to, such as ranking, relevance, ease of approach from list, space, popularity, user's personal preference, time of day and the like.

For example, one relevant parameter may be a personal user preference such as if a user wants food options like restaurants and cafes to always be on the right or left side, such POI categories may be displayed on that side only. Another parameter could be based on ratings, on time of day and the like.

Further, the vertical ordering of the POI categories on the second display area 503 may align with the colors of the POIs between different levels. The ordering may thus give an indication to the user of those types of POIs on other floors and if the floor/level is changed in the second display area 503, the order of colors may also change to reflect the order of the new level and realignment of the colors vertically.

In the exemplary mapping application user interface 500, the POI categories in the second display area 503 are sorted based on square space or floor area occupied in the venue. The more space a POI category occupies, the more it will be on the right. For example, in mapping application interface 500, the red POI category has the most space in the venue as such it is displayed at the right edge of the second display area 503.

FIGS. 6A-6B illustrates exemplary interfaces for depicting an interaction with the mapping application interface according to the method of FIG. 4 according to an example embodiment.

The exemplary interfaces 6A-6B of the mapping application interface 600 illustrate how the view of the mapping application interface 600A changes when a user performs an input gesture to select a single level, such as the level −1 from the second display area 503. When the user selects a single level, such as by pressing the number indicating that level on the second display area 503, the view of the mapping application interface 600A changes to a single level mode, as shown in FIG. 600B. In this mode, only the selected level is shown as a bar-graph on the second display area 503.

FIG. 7 illustrate a flow diagram of another method for displaying the mapping application user interface according to an example embodiment The method includes at 701, displaying a first display area to display a plurality of geographic objects, such as points of interest (POIs), on the mapping application user interface. The method 700 further includes, at 703, displaying a second display area to display a plurality of categories for the plurality of geographic objects on the basis of context information. Additionally, the method 700 includes, at 705, changing the display of plurality of geographic objects on the first display area based on a first input gesture performed on the second display area. The method 700 further includes, at 707, selecting a single category from the plurality of categories displayed on the second display area. The single category may be selected by performing a second input gesture on the second display area. Further, the method 700 includes, at 709, changing the display of the first display area to display the plurality of POIs for the single category selected from the plurality of categories on the second display area. Additionally, the method 700 includes, at 711, changing the display of the second display area to display the plurality of POIs for the single selected category. In some example embodiments, the method can further include performing a third input gesture for selecting a single POI from the plurality of POIs displayed on the second display area to explore more information about that POI category. Such information may include information such as working business hours, ratings, popularity, brands availability, shop location, loyalty related information, level of business, queuing time, last purchase at that shop, items on the shopping list that can be found in that shop, pricing information, discount or offer related information and the like, for the selected POI.

FIGS. 8A-8B illustrates exemplary interfaces for depicting an interaction with the mapping application user interface according to an input gesture in accordance with an example embodiment.

The user holding the computing device 101 performs a one-handed interaction with the mapping application user interface, such as the mapping application user interface 800A, to change the view of the mapping application, such as to change the 2.5D map displayed in the first display area of the computing device 101. For example, the 2.5D map in FIG. 800A illustrates the view of a level of a venue having some highlighted geographic objects, such as POIs depicted in orange color. The user is touching the orange color category on the second display area. When the user slides from one POI category (such as in FIG. 800A) to another (such as in FIG. 800B), the highlights in the 2.5D map area change accordingly. The user performs the sliding gesture with one finger (such as the thumb). The sliding in FIG. 800B stops at the POI category depicted in red color. Thus, the highlights in the 2.5D map in FIG. 800B now depict the POIs belonging to the red category, in red color.

This allows the user to quickly and intuitively explore all relevant shops on a given level, such as a floor of a multi-level venue, such as a mall. For example, if a user wants to explore tech. shops on a floor, they can quickly scroll to the POI category for tech. shops for that level or floor.

The user can further explore a POI category by performing a long press input gesture on that POI category.

FIGS. 9A-9C illustrates exemplary input gestures, such as a long press gesture, for depicting an interaction with the mapping application user interface according to an example embodiment.

With a long press on one POI category (FIG. 900A), the level bar on the second display area changes from categories to POIs (FIG. 900B) and further, an input gesture such as "zooms in" on a particular POI, causes the corresponding POI to be selected and displayed on the first display area, such as in FIG. 900C. For example, on the POI category for tech. shops, the user can zoom in on a specific tech. shop, such as Media market among the tech. shops. The user can further perform an input gesture such as panning, zooming, tilting, sliding, rotating, and the like using a single point of interaction, such using only the thumb to interact on the selected POI on the second display area, and the corresponding view of the selected POI will be adjusted accordingly on the first display.

FIG. 10 illustrates exemplary information 1000 displayed on the second display area on the basis of performing an input gesture on the second display area according to an embodiment.

FIG. 10 illustrates that with a long press on one item of the level bar, it changes from a POI category to POIs. For example, a long press on a category representing restaurants on a level may cause the bar on the second display area to change to display names of different restaurant on that level in the form of labels on sub-bars. Another long press may change the level bar to information 1000 representing actionable items for this particular POI such as illustrated in FIG. 10. For example, a user may select a specific restaurant from the sub-bar displaying the names of different restaurants. Such as a user may select a restaurant, such as Subway, then the level bar on the second display area may change to display different types of text information related to the restaurant Subway, such as opening and closing hours, cost of a meal for 2 at the restaurant, restaurant ratings and the like.

In some example embodiments, the user may access all the information disclosed above on a computing device, such as the computing device 101 of FIG. 1. The computing device 101 may be configured to perform different processing and display related operations for implementing the one or more functionalities of the mapping application user interface described above. In some example embodiments, the computing device 101 may include a chip set capable of performing various processing operations for implementing the mapping application user interface disclosed herein.

FIG. 11 is a diagram of a chip set that can be used to implement an embodiment of the invention.

FIG. 11 illustrates a chip set or chip 1100 upon which an embodiment of the invention may be implemented. Chip set 1100 is programmed to provide a contextual menu in a map display as described By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1100 can be implemented in a single chip. It is further contemplated that in certain embodiments the chip set or chip 1100 can be implemented as a single "system on a chip." It is further contemplated that in certain embodiments a separate ASIC would not be used, for example, and that all relevant functions as disclosed herein would be performed by a processor or processors. Chip set or chip 1100, or a portion thereof, constitutes a means for performing one or more steps of providing user interface navigation information associated with the availability of functions. Chip set or chip 1100, or a portion thereof, constitutes a means for performing one or more steps of providing a contextual menu in a map display.

In one embodiment, the chip set or chip 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1100 includes merely one or more processors and some software and/or firmware supporting and/or relating to and/or for the one or more processors.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to provide a contextual menu in a map display. The memory 1105 also stores the data associated with or generated by the execution of the inventive steps.

In an example, the chipset 1100 may be used in a mobile device, such as the computing device 101 of FIG. 1, for displaying a mapping application user interface in accordance with the example embodiments disclosed herein.

FIG. 12 is a diagram of a mobile device that can be used to implement an embodiment of the invention. For example, FIG. 12 can be used to implement the computing device 101 of FIG. 1 for interacting with a mapping application user interface in accordance with the various exemplary embodiments disclosed herein.

FIG. 12 is a diagram of exemplary components of a mobile terminal 1201 (e.g., handset) for communications, which is capable of operating in the system of FIG. 1, according to one embodiment. In some embodiments, mobile terminal 1201, or a portion thereof, constitutes a means for performing one or more steps of providing a contextual menu in a map display. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile terminal functions that perform or support the steps of providing a contextual menu in a map display. The display 1207 includes display circuitry configured to display at least a portion of a user interface of the mobile terminal (e.g., mobile telephone). Additionally, the display 1207 and display circuitry are configured to facilitate user control of at least some functions of the mobile terminal. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile terminal 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (Wi-Fi), satellite, and the like, or any combination thereof.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203 which can be implemented as a Central Processing Unit (CPU) (not shown).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs user interface software to facilitate user control of at least some functions of the mobile terminal 1201 to provide a contextual menu in a map display. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the terminal. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile terminal 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable storage medium known in the art. The memory device 1251 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1249 carries, for instance, important information, such as the cellular phone number, the carrier supplying service, subscription details, and security information. The SIM card 1249 serves primarily to identify the mobile terminal 1201 on a radio network. The card 1249 also contains a memory for storing a personal telephone number registry, text messages, and user specific mobile terminal settings.

Embodiments disclosed herein may provide various advantages to provide one-handed interaction with multi-level venue maps accessed by users using their mobile device. Some embodiments discussed herein enable the user to explore a venue on their mobile phone with only one hand. This may in turn provide a safe, comfortable, intuitive and fun way to getting understanding of the overall POIs and structure of venue. The methods and systems disclosed herein provide a very intuitive way on the mobile to simplify the complexity of the Multi-level 3D space and quickly navigate through the venue content without having to type anything. Further, the various embodiments disclosed herein may combine many technologies and technical fields, including, but not limited to such as indoor maps, positioning technologies, UX development, rendering technologies and the like, to provide an enhanced user experience in accessing map based applications on their mobile device.

The embodiments disclosed herein may be specifically advantageous in providing very useful features for people in unfamiliar venues and malls and at the same time saving time, energy and money of users.

The embodiments discussed herein may also provide an overview of what is on other levels, allow easy to jump back and force between a zoomed-in view and the mall overview, more efficient in finding the right shops and their way to the shops, causing less frustration and disoriented in the large shopping malls, providing a better mental model of the venue and hence feel more "at ease" in the venue.

In an example embodiment, an apparatus for performing the methods 400 and 700 of FIGS. 4 and 7 above may comprise a processor (e.g. the processing modules 1100) configured to perform some or each of the operations of the methods FIG. 4 and FIG. 7 described previously. The processor may, for example, be configured to perform the operations (401-405) and (701-711) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (401-405) and (701-711) may comprise, for example, the processing modules 1100 which may be implemented in the computing device 101 and/or a device or circuit for executing instructions or executing an algorithm for processing information as described above.

The same implementation can obviously be duplicated to many other venue types, including airports, amusement parks, sport facilities, etc., allowing people to quickly explore and get familiar with such venues.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for displaying a mapping application user interface on a computing device, wherein the mapping application user interface comprises at least a first display area and a second display area, the method comprising:
   displaying on the first display area, a map of a multi-level venue, the map comprising a plurality of levels and a plurality of geographic objects located on the plurality of levels;
   displaying on the second display area, a plurality of categories for filtering of the plurality of geographic objects, wherein the plurality of categories are grouped according to a context information for displaying on the second display area, wherein displaying the second display area includes displaying a bar graph having a plurality of bars showing the plurality of categories, wherein each bar is associated with a different respective level of the multi-level venue, wherein a respective bar in the bar graph includes a plurality of differently sized sub-bars representative of different categories of the plurality of categories on the respective level with which the respective bar is associated, wherein a size of a sub-bar is based on a parameter associated with the category represented by the sub-bar; and changing the display of the plurality of geographic objects on the first display area, in response to detection of a first input gesture on the second display area.

2. The method of claim 1, wherein the second display area is proximate to a user's thumb for facilitating performing of the first input gesture using one-handed interaction with the computing device.

3. The method of claim 1 further comprising;

performing a second input gesture on one of the plurality of categories displayed on the second display area, wherein performing the second input gesture comprises selecting the one of the plurality of categories by performing the second input gesture;

changing the display of the plurality of geographic objects on the first display area to display the geographic objects associated with the selected category from the plurality of categories on the first display area, in response to detection of the second input gesture on the second display area; and changing the display on the second display area to display a plurality of labels corresponding to the plurality of geographic objects associated with the selected category, in response to detection of the second input gesture on the second display area.

4. The method of claim 3 further comprising:

performing a third input gesture on one of the plurality of labels displayed on the second display area, wherein performing the third input gesture comprises selecting the one of the plurality of labels by performing the third input gesture;

changing the display on the first display area to display an enlarged view of a geographic object associated with the selected one of the plurality of labels, in response to detection of the third input gesture on the second display area; and changing the display on the second display area to display a plurality of text items corresponding to the selected one of the plurality labels, in response to detection of the third input gesture on the second display area.

5. The method of claim 4, wherein the first input gesture, the second input gesture, and the third input gesture on the second display area include at least in part, one or more gestures using a single-point of interaction on the mapping application user interface including, at least in part, at least one one-thumb gesture, at least one one-finger gesture, or a combination thereof.

6. The method of claim 5, wherein the one or more gestures include at least in part, a pressing gesture, a long pressing gesture, a sliding gesture or a combination thereof.

7. The method of claim 1, wherein the context information includes personalized information related to a user of the computing device.

8. The method of claim 1, wherein the context information includes information related to the size of each of the plurality of geographic objects, wherein the display of the plurality of categories on the second display area is arranged according to the size of the plurality of geographic objects in each category of the plurality of categories.

9. An apparatus comprising:

a mapping application user interface comprising at least a first display area and a second display area;

at least one processor; and at least one memory including computer program code for one or more programs, the at least one memory and the computer program code configured to, with the at least one processor, cause the apparatus to perform at least the following:

display on the first display area, a map of a multi-level venue comprising a plurality of levels and a plurality of geographic objects located on the plurality of levels;

display on the second display, a plurality of categories for filtering of the plurality of geographic objects, wherein the plurality of categories are grouped according to a context information for displaying on the second display area, wherein displaying the second display area includes displaying a bar graph having a plurality of bars showing the plurality of categories, wherein each bar is associated with a different respective level of the multi-level venue, wherein a respective bar in the bar graph includes a plurality of differently sized sub-bars representative of different categories of the plurality of categories on the respective level with which the respective bar is associated, wherein a size of a sub-bar is based on a parameter associated with the category represented by the sub-bar; and change the display of the plurality of geographic objects on the first display area, in response to detection of a first input gesture on the second display area, wherein the second display area is proximate to a user's thumb for facilitating performing of the first input gesture using one-handed interaction with the apparatus.

10. The apparatus of claim 9, wherein the apparatus is further caused to:

receive a second input gesture on one of the plurality of categories displayed on the second display area, wherein receiving the second input gesture causes selection of the one of the plurality of categories;

change the display of the plurality of geographic objects on the first display area to display the geographic objects associated with the selected category from the plurality of categories on the first display area, in response to reception of the second input gesture on the second display area; and change the display on the second display area to display a plurality of labels corresponding to the plurality of geographic objects associated with the selected category, in response to reception of the second input gesture on the second display area.

11. The apparatus of claim 10, wherein the apparatus is further caused to:

receive a third input gesture on one of the plurality of labels displayed on the second display area, wherein receiving the third input gesture causes selection of the one of the plurality of labels;

changing the display on the first display area to display an enlarged view of a geographic object associated with the selected one of the plurality of labels, in response to reception of the third input gesture on the second display area; and changing the display on the second display area to display a plurality of text items corresponding to the selected one of the plurality labels, in response to reception of the third input gesture on the second display area.

12. The apparatus of claim 11, wherein the first, second, and third input gestures on the second display area include at least in part, one or more gestures using a single-point of interaction on the mapping application user interface including, at least in part, at least one one-thumb gesture, at least one one-finger gesture, or a combination thereof.

13. The apparatus of claim 12, wherein the one or more gestures include at least in part, a pressing gesture, a long pressing gesture, a sliding gesture or a combination thereof.

14. The apparatus of claim 9, wherein the context information includes personalized information related to a user of the apparatus.

15. The apparatus of claim 9, wherein the context information includes information related to the size of each of the plurality of geographic objects, wherein the display of the plurality of categories on the second display area is arranged according to the size of the plurality of geographic objects in each category of the plurality of categories.

16. A computer program product comprising at least one non-transitory computer-readable storage medium having computer-executable program code instructions stored therein, the computer-executable program code instructions comprising program code instructions to:

display a first display area to display a map of a multi-level venue, the map comprising a plurality of levels and a plurality of geographic objects located on the plurality of levels;

display a second display area to display a plurality of categories for the plurality of geographic objects, wherein the plurality of categories are grouped according to a context information on the second display area, wherein displaying the second display area includes displaying a bar graph having a plurality of bars showing the plurality of categories, wherein each bar is associated with a different respective level of the multi-level venue, wherein a respective bar in the bar graph includes a plurality of differently sized sub-bars representative of different categories of the plurality of categories on the respective level with which the respective bar is associated, wherein a size of a sub-bar is based on a parameter associated with the category represented by the sub-bar; and change the display of the plurality of geographic objects on the first display area according to a first input gesture on the second display area, wherein the second display area is proximate to a user's thumb for facilitating performing of the first input gesture using one-handed interaction.

17. The method of claim 1, further comprising receiving the first input gesture selecting one bar from the plurality of bars displayed by the second display area, and wherein changing the display comprises changing the map displayed on the first display area to a single level mode that depicts only the level associated with the one bar that has been selected by the input gesture.

18. The method of claim 1, wherein the parameter associated with the category represented by the sub-bar upon which the size of the sub-bar is based comprises a number of geographic objects in the category represented by the sub-bar.

19. The apparatus of claim 9, wherein the apparatus is also caused to receiving the first input gesture via the mapping application user interface selecting one bar from the plurality of bars displayed by the second display area, and wherein the apparatus is caused to change the display by changing the map displayed on the first display area to a single level mode that depicts only the level associated with the one bar that has been selected by the input gesture.

20. The computer program product of claim 16 wherein the computer-executable program code instructions further comprise program code instructions to receive the first input gesture selecting one bar from the plurality of bars displayed by the second display area, and wherein the program code instructions to change the display comprise program code instructions to change the map displayed on the first display area to a single level mode that depicts only the level associated with the one bar that has been selected by the input gesture.

* * * * *